US011580972B2

(12) United States Patent
Shinohara

(10) Patent No.: US 11,580,972 B2
(45) Date of Patent: Feb. 14, 2023

(54) ROBOT TEACHING DEVICE

(71) Applicant: Fanuc Corporation, Yamanashi (JP)

(72) Inventor: Naruki Shinohara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 441 days.

(21) Appl. No.: 16/849,328

(22) Filed: Apr. 15, 2020

(65) Prior Publication Data

US 2020/0342872 A1 Oct. 29, 2020

(30) Foreign Application Priority Data

Apr. 26, 2019 (JP) .............................. JP2019-086752

(51) Int. Cl.
*G10L 15/22* (2006.01)
*B25J 9/16* (2006.01)
*G10L 15/26* (2006.01)
*G10L 15/08* (2006.01)

(52) U.S. Cl.
CPC .............. *G10L 15/22* (2013.01); *B25J 9/163* (2013.01); *G10L 15/08* (2013.01); *G10L 15/26* (2013.01); *G10L 2015/088* (2013.01); *G10L 2015/223* (2013.01)

(58) Field of Classification Search
CPC .......................... G10L 2015/223; G10L 15/22
See application file for complete search history.

(56) References Cited

U.S. PATENT DOCUMENTS

| 7,561,124 B2 | 7/2009 | Kwak et al. | |
| 2018/0302285 A1* | 10/2018 | Roman | G06F 3/167 |
| 2019/0088252 A1 | 3/2019 | Yoshida et al. | |
| 2020/0189099 A1* | 6/2020 | Sindhwani | G06N 3/008 |

FOREIGN PATENT DOCUMENTS

| CN | 203300127 U | * 11/2013 | |
| CN | 107053191 B | * 5/2020 | B25J 11/001 |
| JP | 10225886 A | 8/1998 | |
| JP | 2002283259 A | 10/2002 | |
| JP | 2002318609 A | 10/2002 | |
| JP | 2003080482 A | 3/2003 | |
| JP | 2005148789 A | 6/2005 | |
| JP | 2006068865 A | 3/2006 | |

(Continued)

*Primary Examiner* — Douglas Godbold
(74) *Attorney, Agent, or Firm* — RatnerPrestia

(57) ABSTRACT

A robot teaching device includes: a display device; an operation key formed of a hard key or a soft key and including an input changeover switch; a microphone; a voice recognition section; a correspondence storage section storing each of a plurality of types of commands and a recognition target word in association with each other; a recognition target word determination section configured to determine whether a phrase represented by character information includes the recognition target word; and a command execution signal output section configured to switch, in response to the input changeover switch being operated, between a first operation in which a signal for executing the command corresponding to an operation to the operation key is outputted and a second operation in which a signal for executing the command associated with the recognition target word represented by the character information is outputted.

13 Claims, 10 Drawing Sheets

(56) References Cited

FOREIGN PATENT DOCUMENTS

| JP | 2009145883 A | * | 7/2009 | |
|---|---|---|---|---|
| JP | 2013136131 A | | 7/2013 | |
| JP | 2015231659 A | | 12/2015 | |
| JP | 2019057123 A | | 4/2019 | |
| KR | 19990044544 A | * | 6/1999 | ............. A63F 13/10 |
| KR | 20200085712 A | * | 7/2020 | ............. B25J 9/1628 |
| WO | WO-2020045732 A1 | * | 3/2020 | ........... A47L 9/2852 |

* cited by examiner

ROBOT TEACHING DEVICE

CROSS-REFERENCE TO RELATED APPLICATIONS

This application is a new U.S. Patent Application that claims benefit of Japanese Patent Application No. 2019-086752, dated Apr. 26, 2019, the disclosure of this application is being incorporated herein by reference in its entirety for all purposes.

BACKGROUND OF THE INVENTION

1. Field of the Invention

The present invention relates to a robot teaching device.

2. Description of the Related Art

A robot operation program is generally created and edited through key operation for a teaching device. JP 2006-68865 A, JP 2002-283259 A, and JP 10-225886 A each disclose an example of a teaching device having a voice input function. JP 2006-68865 A discloses that "In the case of the present invention, when an operator presses the voice input active switch 7 and utters a desired operation menu to the voice input section 6, the voice signal input to the voice input section 6 is converted to corresponding text by the voice recognition processing section 8, the resulting text is compared with a registration menu of the storage means 10d, and the registered operation menu screen is selected and displayed on the display screen 5c." (paragraph 0009).

JP 2002-283259 A discloses that "By designating a plurality of basic operations on a voice basis, and storing an operation record, a combined operation formed by combining the plurality of basic operations in time-series order can be named as a new operation only in voice-based interaction. A user can designate complicated continuous operations by using only one word, and can easily have a conversation with the robot." (abstract). JP 10-225886 A discloses that "A voice input device 30 is connected to a main control section 12 of a robot, and when contents of an operation is input through a microphone 32 of the device 30, a voice recognition section 34 recognizes the contents, a voice input device control section 36 conveys the contents to the main control section 12, and the operation of the robot is performed." (abstract).

SUMMARY OF THE INVENTION

In teaching of an industrial robot using a teaching device, there are cases where an operator performs another task together with the teaching of the robot. There is a desire for a robot teaching device capable of further reducing a burden of the operator in the teaching of the robot.

An aspect of the present disclosure is a robot teaching device configured to perform teaching of a robot, the robot teaching device includes: a display device; an operation key formed of a hard key or a soft key disposed on a display screen of the display device, and the operation key including an input changeover switch configured to switch whether or not to accept voice input; a microphone configured to collect voice and output a voice signal; a voice recognition section configured to perform voice recognition processing on the voice signal and output character information represented by the voice; a correspondence storage section configured to store each of a plurality of types of commands used in the teaching of the robot and a recognition target word in association with each other; a recognition target word determination section configured to determine whether or not a phrase represented by the character information includes the recognition target word stored in the correspondence storage section; and a command execution signal output section configured to switch, in response to the input changeover switch being operated, between a first operation in which a signal for executing the command corresponding to an operation to the operation key is outputted and a second operation in which a signal for executing the command stored in the correspondence storage section in association with the recognition target word determined to be included in the phrase represented by the character information is outputted.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
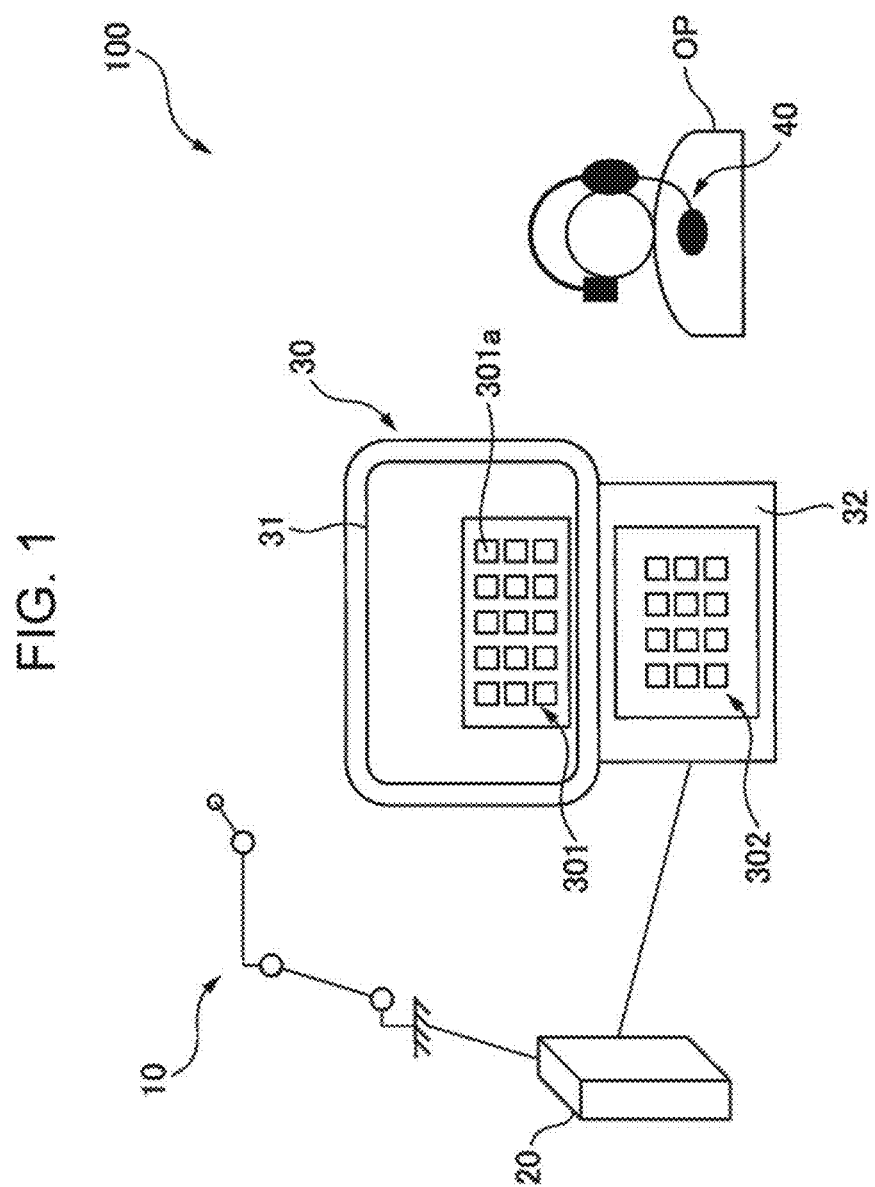
FIG. 1 is a diagram illustrating an overall configuration of a robot system including a robot teaching device according to an embodiment.

Embodiments of the present invention will be described below with reference to the accompanying drawings. Throughout the drawings, corresponding components are denoted by common reference numerals. For ease of understanding, these drawings are scaled as appropriate. The embodiments illustrated in the drawings are examples for implementing the present invention, and the present invention is not limited to the embodiments illustrated in the drawings.

Figure 2:
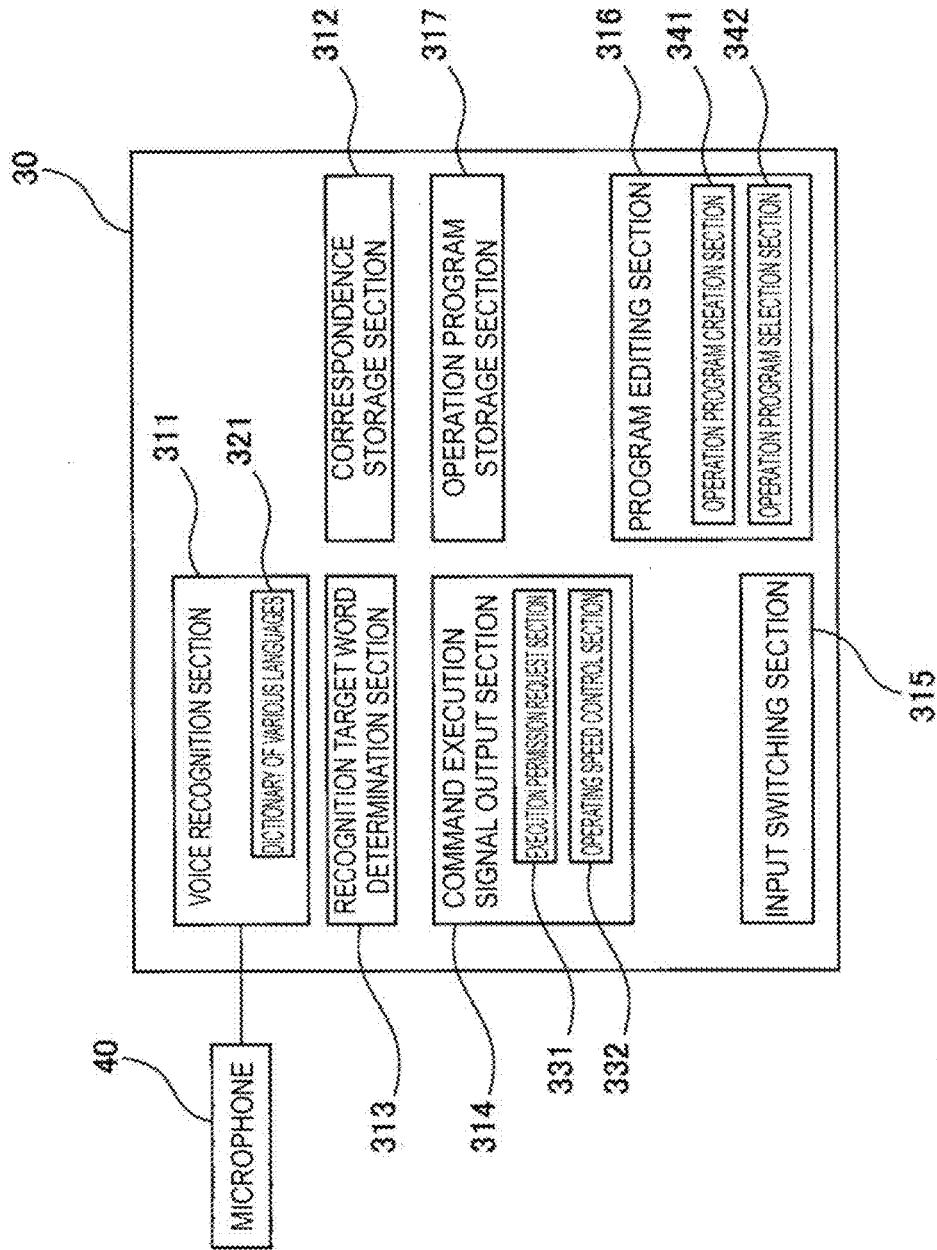
FIG. 2 is a function block diagram illustrating the robot teaching device.

FIG. 1 is a diagram illustrating an overall configuration of a robot system 100 including a robot teaching device 30 according to an embodiment. FIG. 2 is a function block diagram illustrating the robot teaching device 30. As illustrated in FIG. 1, the robot system 100 includes a robot 10, a robot controller 20 configured to control the robot 10, and the robot teaching device 30 connected to the robot controller 20. A microphone 40 that collects voice and outputs a voice signal is connected to the robot teaching device 30 by wire or wirelessly. As an example, in FIG. 1, the microphone 40 is configured as a headset-type microphone mounted on an operator OP operating the robot teaching device 30. Note that the microphone 40 may be incorporated in the robot teaching device 30.

The robot 10 is a vertical articulated robot, for example. As the robot 10, another type of robot may be used. The robot controller 20 controls an operation of the robot 10 in response to various commands input from the robot teaching device 30. The robot controller 20 may have a general computer configuration including a CPU, a ROM, a RAM, a storage device, a display section, an operation section, an external device interface, a network interface, and the like. The robot teaching device 30 is, for example, a teach pendant or a portable information terminal such as a tablet terminal or the like. The robot teaching device 30 may have a general computer configuration including a CPU, a ROM, a RAM, a storage device, a display section, an operation section, an external device interface, a network interface, and the like.

The robot teaching device 30 includes a display device 31 and an operation section 32. A hard key (hardware key) 302 for teaching input is disposed in the operation section 32. The display device 31 includes a touch panel, and a soft key 301 arranged as an image is provided on the display screen of the display device 31. The operator OP can perform teaching or operation of the robot 10 by operating an operation key (hard key 302 and soft key 301). The soft key 301 includes an input changeover switch 301a for switching whether or not to accept voice input. Note that in a case where the robot teaching device 30 is a tablet terminal, the robot teaching device 30 may only have a soft key as the operation key. The input changeover switch for switching whether or not to accept voice input may be disposed on the hard key 302.

As illustrated in FIG. 2, the robot teaching device 30 includes: a voice recognition section 311 configured to perform voice recognition processing on a voice signal and output character information represented by voice; a correspondence storage section 312 configured to store each of a plurality of types of commands used in teaching of the robot 10 and a recognition target word in association with each other; a recognition target word determination section 313 configured to determine whether or not a phrase represented by the character information from the voice recognition section 311 includes the recognition target word stored in the correspondence storage section 312; and a command execution signal output section 314 configured to switch, in response to the input changeover switch 301a being operated, between a first operation configured to output a signal for executing the command corresponding to an operation to the operation key and a second operation configured to output a signal for executing the command stored in the correspondence storage section 312 in association with the recognition target word determined to be included in the phrase represented by the character information from the voice recognition section 311. Here, a command used in teaching of a robot is used in a meaning that includes various data relating to a command such as an instruction (including a macro instruction), data associated with the instruction, and the like. For example, by storing beforehand recognition target words corresponding to various instructions (including a macro instruction) to be input by a key operation in the correspondence storage section 312, it is possible to execute a desired instruction by uttering a phrase of expression that is easy to understand for the operator OP, without requiring the operator OP to have detailed knowledge about the instructions.

The voice recognition section 311 may have dictionary data 321 required for voice recognition such as an acoustic model, a language model, or the like, for multiple types of languages. With this configuration, the voice recognition section 311 can identify one or more words from the voice signal and output them as character information in the user-selected language. The command execution signal output section 314 may include an execution permission request section 331 that causes the display device 31 to display an image representing a message for requesting execution permission before outputting a signal for executing a command (operation) to the robot 10. Note that the various functions of the robot teaching device 30 illustrated in FIG. 2 can be achieved by software or by cooperation of hardware and software.

Table 1 indicated below shows an example of information stored in the correspondence storage section 312. In the example of Table 1, a recognition target word "hand open" is associated with an instruction HOP, a recognition target word "hand close" is associated with an instruction HCL, a recognition target word "plus X" is associated with an instruction PX, and a recognition target word "box open" is associated with an instruction BOP. Here, the respective instructions in Table 1 have the following meanings.

HOP: The robot opens the hand.
HCL: The robot closes the hand.
PX: The robot moves its posture in a+x-direction.
BOP: The robot opens a box.

TABLE 1

| Instruction | Recognition Target Word |
|---|---|
| HOP | Hand Open |
| HCL | Hand Close |
| PX | Plus X |
| BOP | Box Open |

Figure 3:
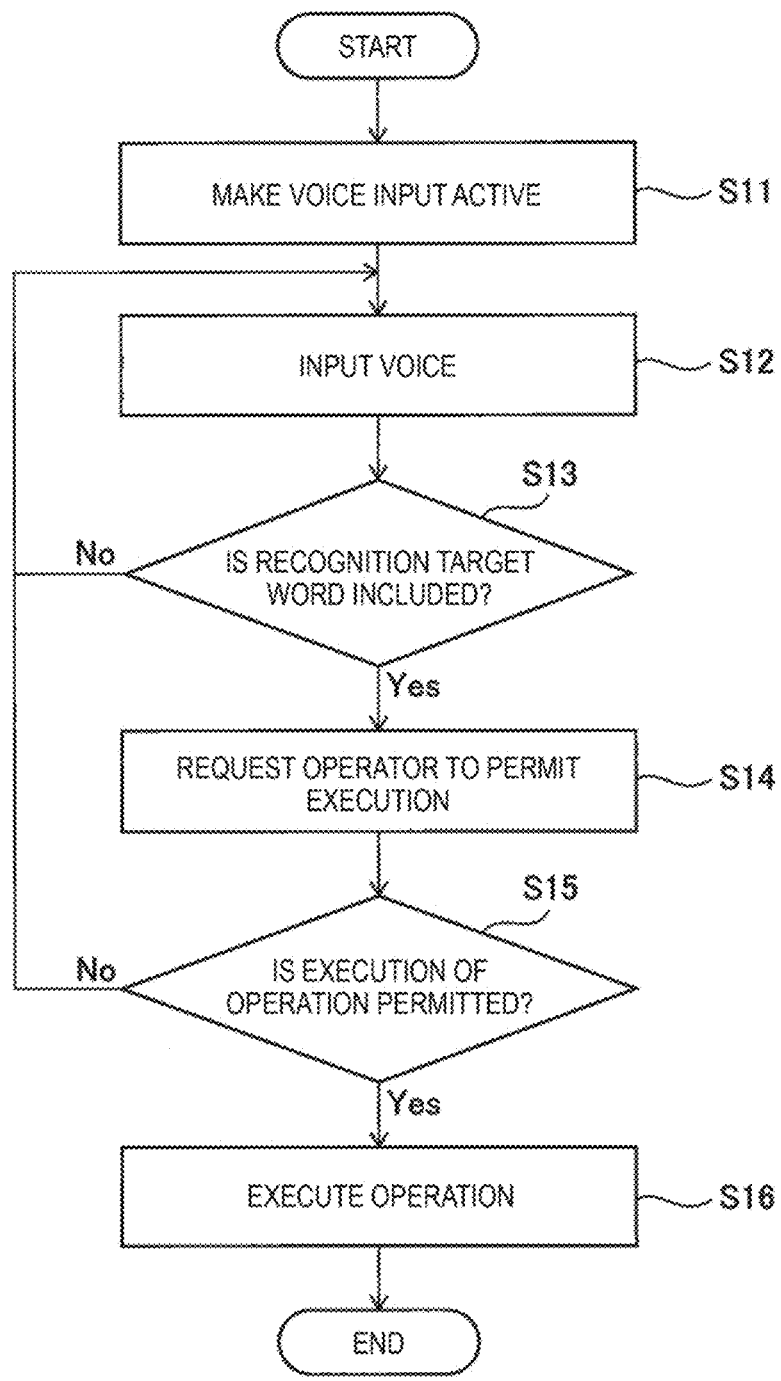
FIG. 3 is a flowchart illustrating a voice input teaching process.

FIG. 3 is a flowchart illustrating a teaching function by voice input (hereinafter referred to as a voice input teaching process) which can be accepted by operation to the input changeover switch 301a. The voice input teaching process of FIG. 3 is executed under the control of the CPU of the robot teaching device 30. The operator OP operates the input changeover switch 301a to make voice input active during a teaching operation to the robot teaching device 30, for example, (step S11). Next, the operator OP utters a recognition target word corresponding to a desired instruction (step S12). As an example, a case is assumed in which the correspondence storage section 312 stores the information shown in Table 1, and the operator OP utters "hand open" with intention of the instruction "HOP" for opening a hand of the robot 10. The robot teaching device 30 identifies whether or not the voice-inputted phrase includes the recognition target word stored in the correspondence storage section 312 (step S13). When the voice-inputted phrase does not include the recognition target word (S13: No), the process returns to step S12. Here, "hand open" uttered by the operator OP is stored in the correspondence storage section 312 as the recognition target word. In this case, it is determined that the voice-inputted phrase includes the recognition target word (S13: Yes), and the process proceeds to step S14.

Figure 4:
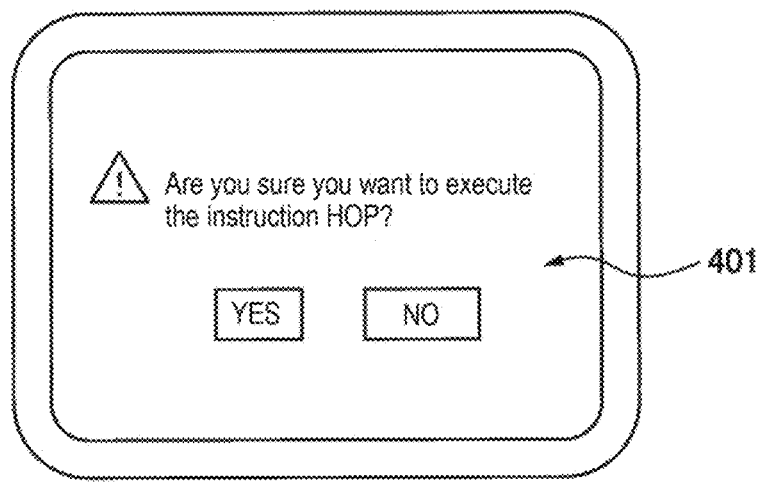
FIG. 4 illustrates an example of a message screen for requesting execution permission of a voice input instruction.

Next, the robot teaching device 30 (execution permission request section 331) displays, on the display device 31, a message screen 401 (see FIG. 4) for requesting the operator OP to permit execution of the voice-inputted instruction (step S14). The message screen 401 includes a selection menu ("Yes" and "No") for accepting a selection operation of whether or not the instruction is executed, by the operator OP. In step S15, the selection operation from the operator OP is accepted. The operator OP can operate a button on the message screen 401 to indicate whether to execute the instructions "HOP". In a case where an operation permitting execution of the instruction is accepted (S15: Yes), the command execution signal output section 314 transmits a signal for executing the instruction to the robot controller 20 (step S16). In a case where an operation not permitting execution of the instruction is accepted (S15: No), the process returns to step S12.

In step S15, the robot teaching device 30 may be configured so as to accept a selection operation by voice input in a state in which the message screen 401 is displayed. In this case, when the voice recognition section 311 can identify the word "Yes" for permitting the execution of the instruction, the robot teaching device 30 determines that the execution of the instruction is permitted. The command execution signal output section 314 transmits a signal for executing the instruction "HOP" to the robot controller 20.

The input changeover switch 301a may be a switch which functions so as to switch the robot teaching device 30 between a state for accepting the voice input and a state for accepting a key operation each time the switch is pressed, or may be a switch which functions so as to make the robot teaching device 30 be in a state for accepting voice input only while the switch is pressed.

In teaching of an industrial robot, there are cases where the operator OP performs a task together with the operation of the robot. Even in the situation as described above, by operating the input changeover switch 301a as necessary, the operator OP can proceed the teaching task smoothly without causing interruption of the teaching task while switching between the teaching by key operation and the teaching by voice input at an appropriate timing. As an example, a scene is assumed in which an operator performs, while holding the robot teaching device 30 with one hand and having a workpiece with the other hand, an operation so as to cause a hand device of the robot to grasp the workpiece. Even in such a scene, the operator OP may make the voice input active in a state in which the robot 10 takes a posture for receiving the workpiece by the key operation, move the eyes to the robot and hold up the workpiece, and utter "hand close". When the workpiece is completed to be grasped, the operator can immediately return the eyes to the robot teaching device, make the key operation active, and continue the key operation.

As illustrated in FIG. 2, the command execution signal output section 314 may include an operating speed control section 332 configured to, when the recognition target word (hereinafter, also referred to as a first recognition target word) associated with a command to operate the robot 10 by the voice input (hereinafter, also referred to as a first command) is continuously determined to be included in the phrase by the recognition target word determination section 313, generate a signal for executing the first command such that an average operating speed of the robot 10 operated by the first command changes in accordance with frequency in which the first recognition target word is continuously determined to be included in the phrase by the recognition target word determination section 313.

Figure 5:
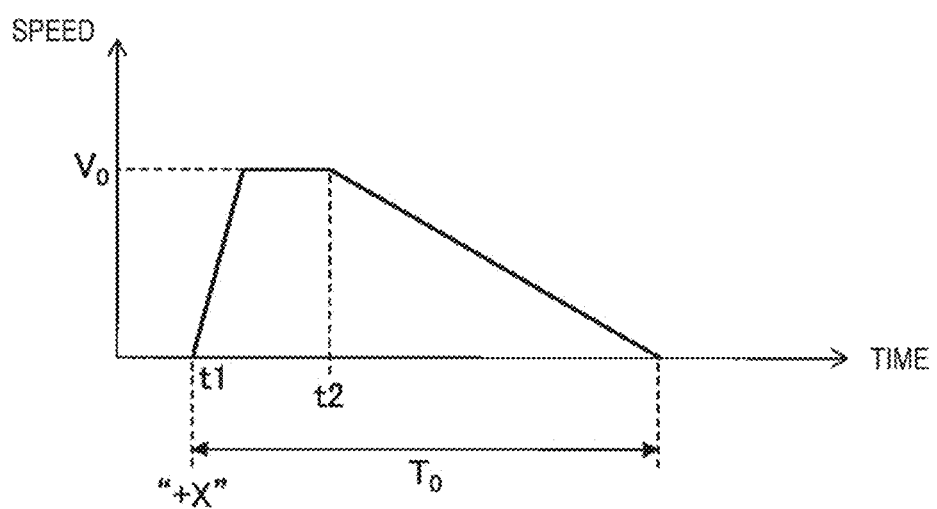
FIG. 5 illustrates an example of a speed control pattern in a case where a command to operate a robot is input by voice input.

FIG. 5 illustrates a speed control pattern by the operating speed control section 332 in a case where the first command is input to the robot teaching device 30 by the voice input. In FIG. 5, the horizontal axis represents time and the vertical axis represents speed. $T_0$ represents the whole length of the speed control pattern. As an example, a case is assumed in which the first command is the instruction PX in Table 1. When the operator OP utters "plus X" and the first command is input to the robot teaching device 30 at a timing t1, the operating speed control section 332 operates once the robot 10 (arm tip) for a predetermined period of time at a speed $V_0$ according to the first command, and then decelerates at a constant deceleration. The deceleration is, for example, a deceleration that the operating speed reaches zero after a predetermined period of time from a timing t2 when the operating speed is turned from the speed $V_0$ to decelerate. That is, in a case where the operator OP utters "plus X" in order to move the robot 10 (arm tip) in the +X-direction, the operating speed control section 332 performs control for reducing the speed at the constant deceleration after once making the speed the speed $V_0$. In a case where the number of uttering of "plus X" is one, the robot 10 operates in the speed control pattern of FIG. 5 and stops.

Figure 6A:
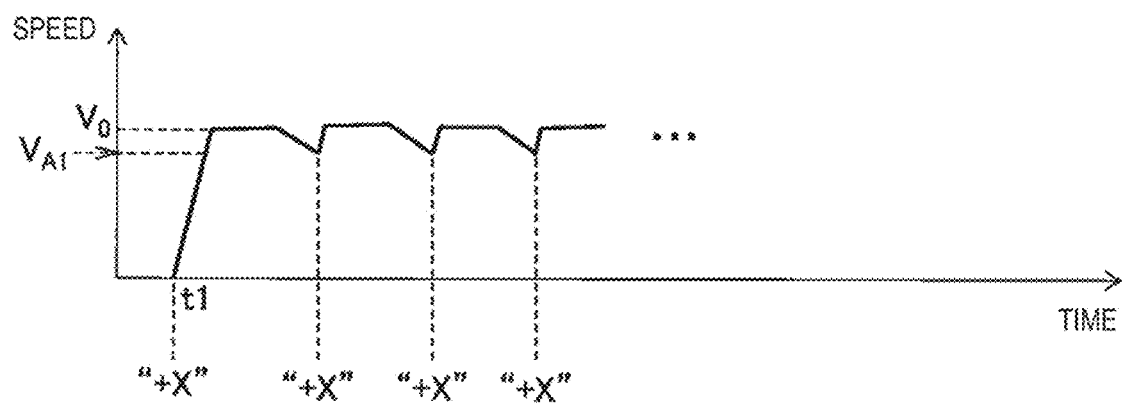
FIG. 6A is a diagram illustrating a state of speed control in a case where input frequency of the command by the voice input is high.
Figure 6B:
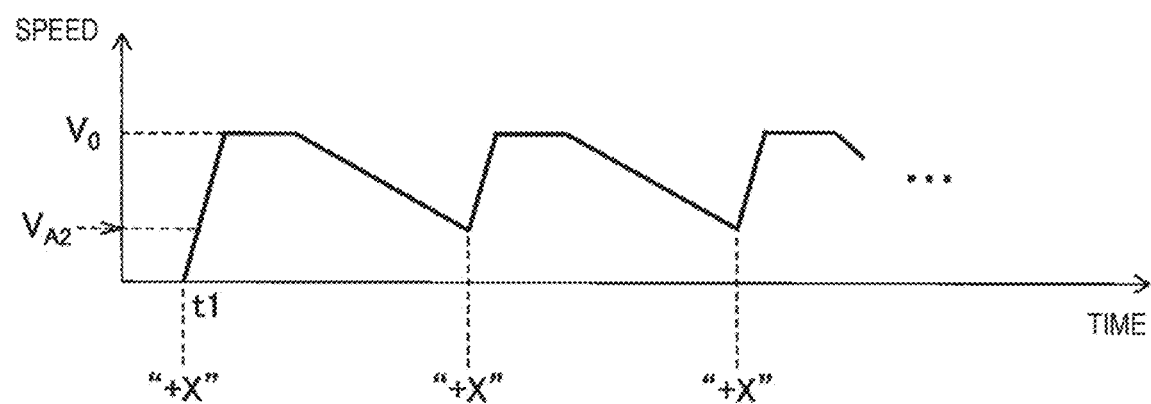
FIG. 6B is a diagram illustrating a state of speed control in a case where the input frequency of the command by the voice input is low.

In a case where speed control is performed in a speed control pattern as illustrated in FIG. 5, by the operator OP uttering "plus X" in a short time interval as illustrated in FIG. 6A, the average movement speed of the robot 10 ($V_{A1}$ in FIG. 6A) can be increased. FIG. 6B illustrates an operating speed of the robot 10 in a case where "plus X" is uttered with a longer time interval than that in FIG. 6A. As illustrated in FIG. 6B, by increasing the time interval at which the operator OP utters "plus X", the average movement speed of the robot 10 ($V_{A2}$ in FIG. 6B) becomes lower than $V_{A1}$.

By performing the speed control described above, it is possible to avoid a situation in which the robot 10 continues to operate with a command by a single utterance, and achieve a movement that takes safety of the operator OP into consideration. Additionally, at the same time, the operator OP can operate the robot 10 at a desired speed by adjusting the frequency of the utterance. Note that the speed control pattern (deceleration pattern) illustrated in FIG. 5 is exemplary, and various operation control patterns (deceleration patterns) in which a speed is once increased in response to the command and then reduced can be used.

The recognition target word determination section 313 may be configured, when a phrase represented by input voice does not include the recognition target word stored in the correspondence storage section 312, so as to extract, from the correspondence storage section 312, one or more recognition target words having a predetermined relevance with the phrase represented by the voice, and to display, on the display device 31, a selection screen for accepting an operation input for selecting one from one or more instructions associated with the extracted one or more recognition target words in the correspondence storage section 312. With reference to FIG. 7 to FIG. 10, two examples of such a function by the recognition target word determination section 313 will be described.

Figure 7:
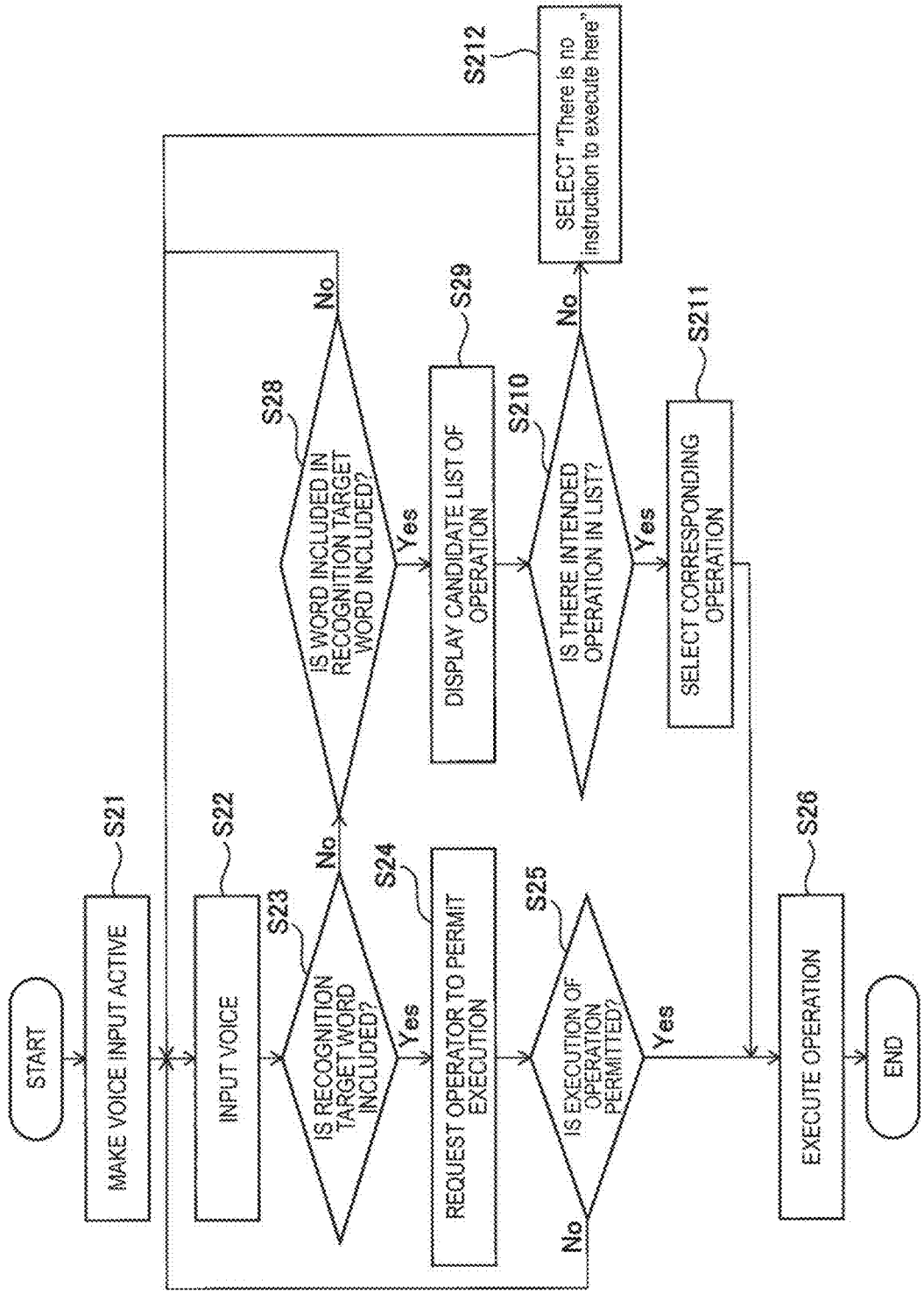
FIG. 7 is a flowchart illustrating a voice input teaching process in a case of including relevance in which a phrase represented by voice includes a word included in a recognition target word.

FIG. 7 is a flowchart illustrating a voice input teaching process in a case of including relevance in which a phrase represented by voice includes a word included in the recognition target words, between the phrase represented by the voice-inputted voice and the recognition target word stored in the correspondence storage section 312. In the flowchart of FIG. 7, steps S21-S26 have the same processing contents as those in steps S11-S16 in FIG. 3, respectively, and thus descriptions thereof will be omitted. In step S23, in a case where it is determined that the voice-inputted phrase does not include the recognition target word (S23: No), the processing proceeds to step S28.

Figure 8:
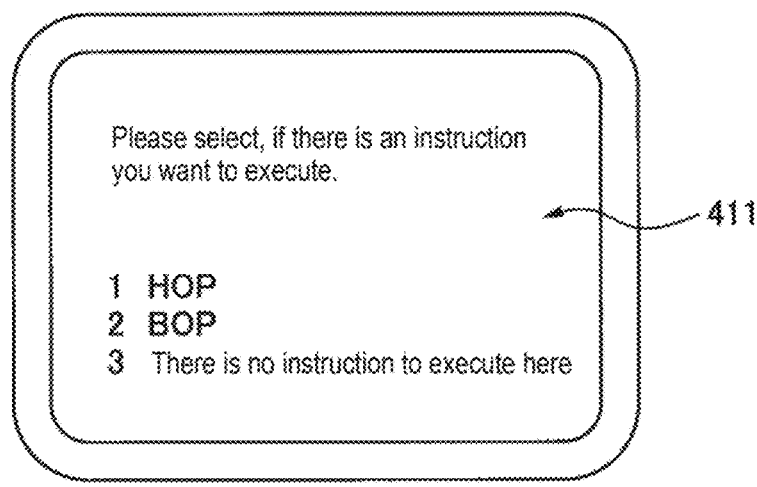
FIG. 8 illustrates a selection screen displayed on a display device in the voice input teaching process in FIG. 7.

In step S28, the robot teaching device 30 determines whether or not the phrase represented by the voice includes a word included in the recognition target words. In a case where the phrase represented by the voice includes the word included in the recognition target words (S28: Yes), the robot teaching device 30 extracts, from the correspondence storage section 312, the recognition target word having relevance that the phrase represented by the voice includes the word included in the recognition target words. The robot teaching device 30 then displays a list of instructions associated with the extracted recognition target words in the correspondence storage section 312 as candidates, on the display device 31 (step S29). In a case where the phrase represented by the voice does not include a word included in the recognition target words (S28: No), the processing returns to step S22. FIG. 8 illustrates a selection screen 411 as an example of the list displayed on the display device 31 in step S29. For example, as shown in Table 2 indicated below, in a case where the utterance of the operator OP includes "open", "hand open" and "box open" of the recognition target words may be extracted as candidates. Additionally, as shown in Table 2 indicated below, in a case where the utterance of the operator OP includes "hand", "hand open" and "hand close" of the recognition target words may be extracted as candidates.

TABLE 2

| Operator Utterance | Recognition Target Word Candidate |
|---|---|
| . . . Open | Hand Open |
|  | Box Open |
| Hand . . . | Hand Open |
|  | Hand Close |

The selection screen 411 in FIG. 8 illustrates an example of a case where when the utterance of the operator OP includes "open", "hand open" and "box open" of the recognition target words are extracted as candidates. The robot teaching device 30 accepts a selection operation by the operator OP via the selection screen 411 (step S210). In a case where there is an operation intended by the operator OP in the selection screen 411, and in a case where a selection operation specifying any operation (instruction) is accepted via the selection screen 411 (S210: Yes), the robot teaching device 30 selects and executes the specified operation (instruction) (steps S211 and S26). In a case where there is no operation intended by the operator OP in the selection screen 411 (S210: No), "There is no instruction to execute here" is selected in the selection screen 411 (S212). In this case, the processing returns to step S22. According to the voice teaching input process described in FIGS. 7-8, even in a case where the robot teaching device 30 can recognize only a part of the utterance contents of the operator OP, the operator OP can make a desired instruction.

Figure 9:
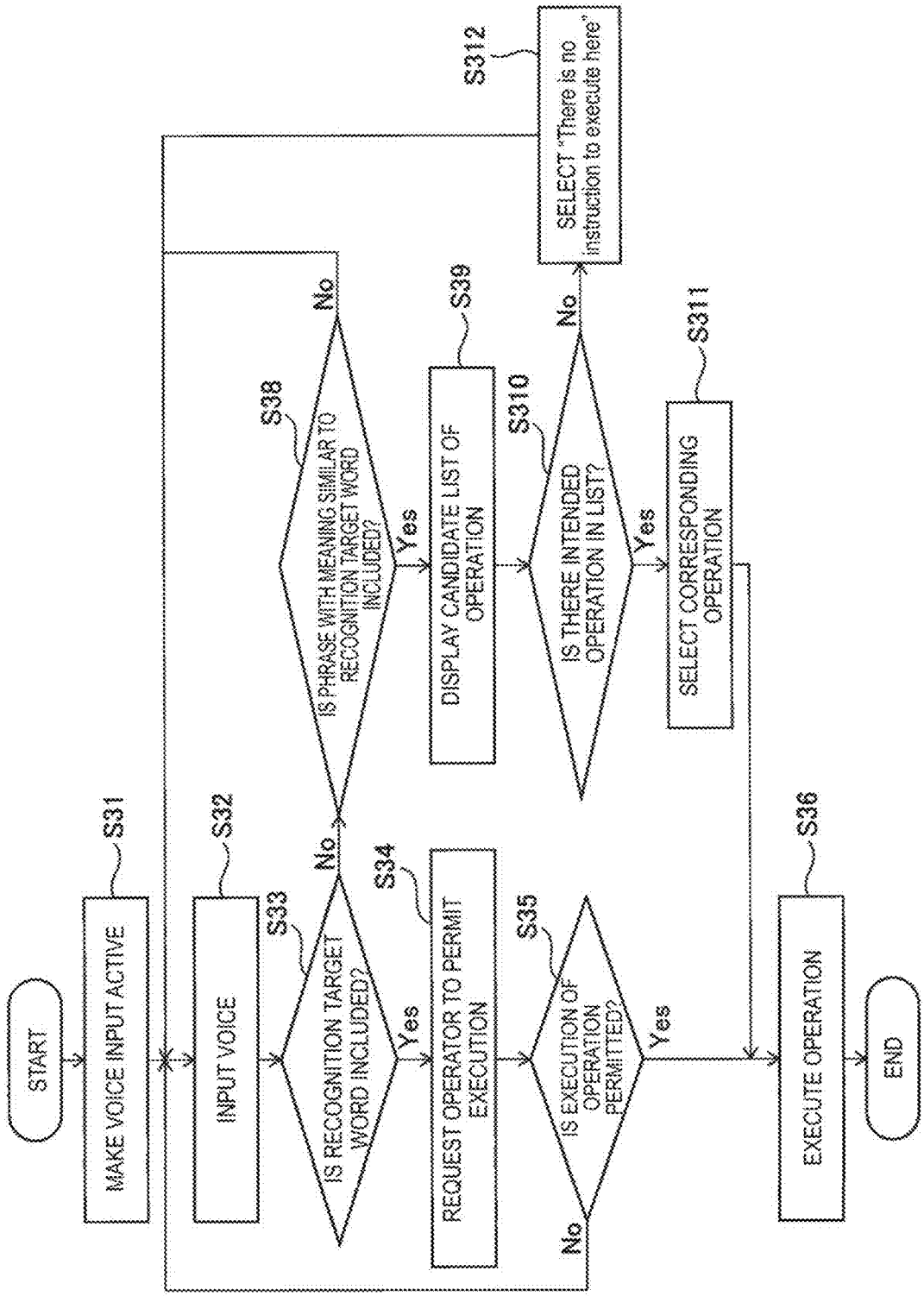
FIG. 9 is a flowchart illustrating a voice input teaching process in a case of including relevance in which a phrase represented by voice-inputted voice includes a phrase having a meaning similar to a recognition target word.

FIG. 9 is a flowchart illustrating a voice input teaching process in a case of including relevance in which a phrase represented by voice includes a phrase having a meaning similar to a recognition target word (in another expression, in a case where a phrase represented by the voice-inputted voice and the recognition target word have a common meaning), between the phrase represented by the voice-inputted voice and the recognition target word stored in the correspondence storage section 312. In the flowchart of FIG. 9, steps S31-S36 have the same processing contents as those in steps S11-S16 in FIG. 3, respectively, and thus descriptions thereof will be omitted. In step S33, in a case where it is determined that the voice-inputted phrase does not include the recognition target word (S33: No), the processing proceeds to step S38.

Figure 10:
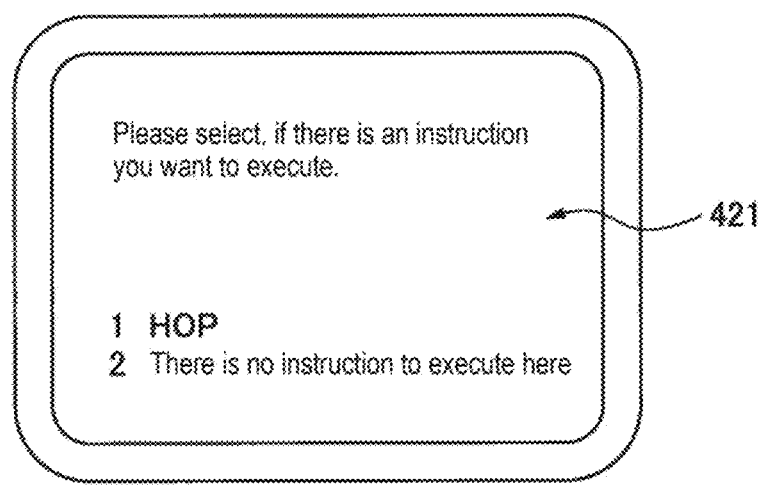
FIG. 10 illustrates a selection screen displayed on the display device in the voice input teaching process in FIG. 9.

In step S38, the robot teaching device 30 determines whether or not the phrase represented by the voice includes a phrase having a meaning similar to the recognition target word. In a case where the phrase represented by the voice includes the phrase having the meaning similar to the recognition target word (S38: Yes), the robot teaching device 30 extracts, from the correspondence storage section 312, the recognition target word having relevance that the phrase represented by the voice includes the phrase having the meaning similar to the recognition target word. As an example, the robot teaching device 30 (recognition target word determination section 313) may have dictionary data in which a phrase that can be the recognition target word and a phrase having a meaning similar to that of such a phrase are associated with each other. The robot teaching device 30 then displays a list of instructions associated with the extracted recognition target word in the correspondence storage section 312 as candidates, on the display device 31 (step S39). FIG. 10 illustrates a selection screen 421 as an example of the list displayed on the display device 31 in step S39. The robot teaching device 30 may store information in which a recognition target word as shown in Table 3 indicated below and a phrase having a meaning similar thereto are associated with each other. In this case, for example, in a case where the utterance of the operator OP is "open hand" or "please open the hand", the robot teaching device 30 can construe the content of these utterances to extract "hand open" as a recognition target word having a meaning similar to the uttered content. Additionally, as shown in Table 3 indicated below, in a case where the utterance of the operator OP is "close hand" or "please close the hand", the robot teaching device 30 can construe the content of these utterances to extract "hand close" as a recognition target word having a meaning similar to the uttered content.

TABLE 3

| Operator Utterance | Recognition Target Word Candidate |
|---|---|
| Open Hand | Hand Open |
| Please Open the Hand |  |
| Close Hand | Hand Close |
| Please Close the Hand |  |

The selection screen 421 in FIG. 10 illustrates an example of a case where, when the utterance of the operator OP is "open hand", "hand open" of the recognition target word is extracted as a candidate. The robot teaching device 30 accepts a selection operation by the operator OP via the selection screen 421 (step S310). In a case where there is an operation intended by the operator OP in the selection screen 421, and in a case where a selection operation specifying one of operations (instructions) is accepted via the selection screen 421 (S310: Yes), the robot teaching device 30 selects and executes the specified operation (instruction) (steps S311 and S36). In a case where there is no operation intended by the operator OP in the selection screen 421 (S310: No), "There is no instruction to execute here" is selected in the selection screen 421 (S312). In this case, the processing returns to step S32. According to the voice teaching input process described in FIGS. 9 to 10, the robot teaching device 30 determines that, at step S38, based on whether a word similar to a word included in the recognition target word is included in the recognized phrase, which recognition target word the phrase is originally intended for. Accordingly, the operator OP can make a desired instruction even in a case where the recognition target word has not been correctly memorized.

Figure 11:
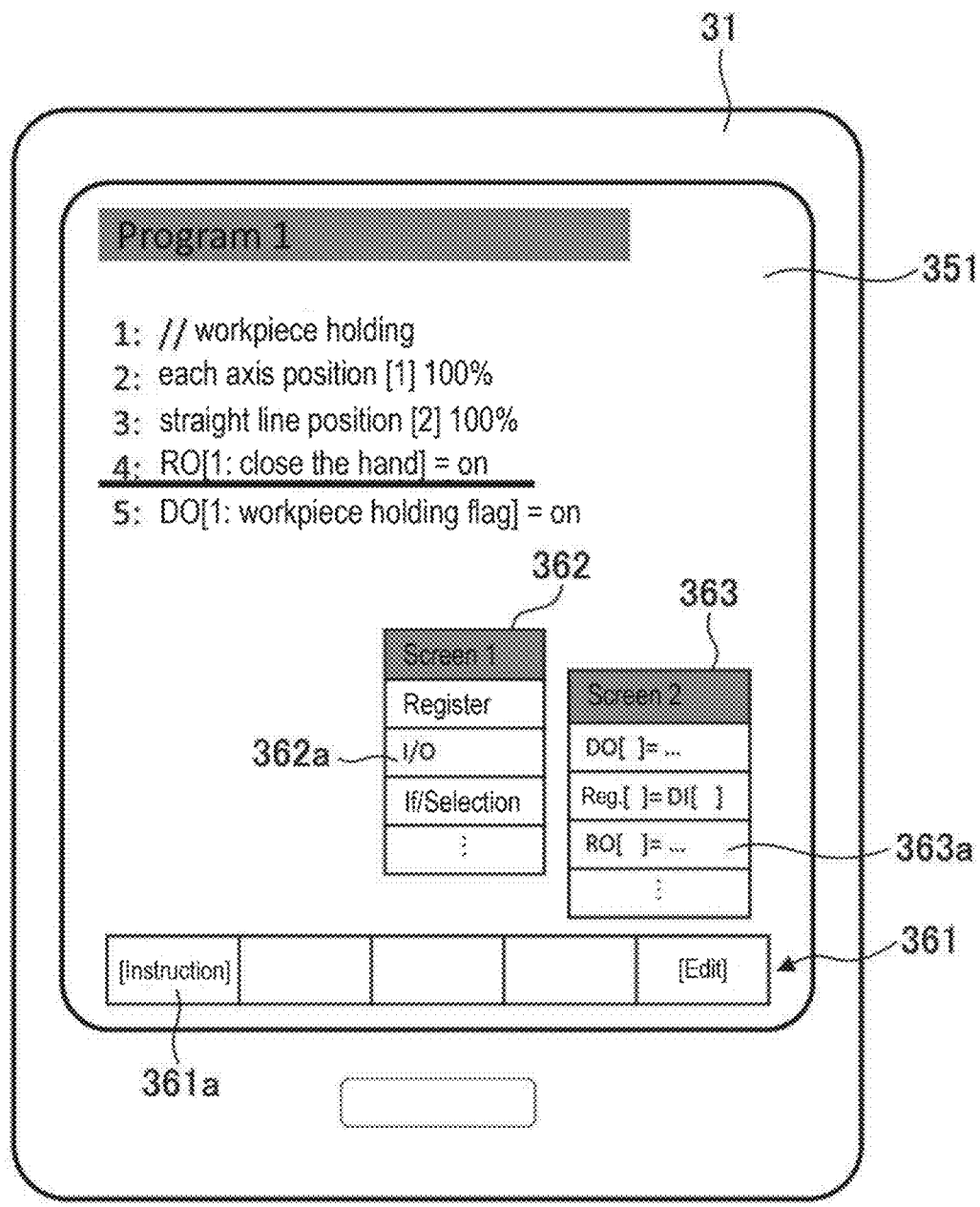
FIG. 11 is a diagram illustrating an example of an editing screen of an operation program.

The robot teaching device 30 may include an input switching section 315 configured to switch a supply source for inputting character data to the robot teaching device 30 from the operation key to the voice recognition section 311 while voice input is made active by the input changeover switch 301a being operated. Specifically, the input switching section 315 switches the supply source from which various application programs running on the robot teaching device 30 accept input of the character data, between the operation key and the voice recognition section 311, in response to the operation with respect to the input changeover switch 301a. The robot teaching device 30 includes a program editing section 316 for creating and editing an operation program. FIG. 11 illustrates, as an example, an editing screen 351 of the operation program displayed on the display device 31 by the program editing section 316. The operator OP selects, for example, the fourth row on the editing screen 351 by key operation, then operates the input changeover switch 301a to make voice input active, and can input a comment sentence "close the hand" for an instruction sentence "ROM" by voice input. On the editing screen 351, "workpiece holding" in the first row and "workpiece holding flag" in the fifth row are each an example of a comment sentence input by voice input.

In a case where voice input is made active in a state in which the editing screen 351 is displayed, when it is determined that the voice-inputted phrase includes the recognition target word, the recognition target word determination section 313 may be configured to automatically insert an instruction associated with the determined recognition target word in an operation program being edited. For example, in a case where a recognition target word "robot output" and an instruction "RO[ ]=" are associated with each other in the correspondence storage section 312, the operator OP can easily input the instruction "RO[ ]=" by uttering "robot output".

When it is assumed that the instruction "RO[ ]=" is input by key operation, it is necessary for the operator OP to perform operations of:

(1) selecting, by key operation, an item "instruction" (reference numeral 361a) for inputting an instruction from a selection menu screen 361 on the bottom of the editing screen 351;

(2) selecting, by key operation, an item "I/O" (reference numeral 362a) for inputting an I/O instruction from a pop-up menu screen 362 in which classification items of instructions are listed and displayed; and (3) selecting, by key operation, the instruction "RO[ ]=" (363a) from a pop-up menu image 363 indicating a list of specific instructions corresponding to the I/O instruction.

In this regard, the function of the recognition target word determination section 313 enables the operator OP to simply input a desired instruction by voice input without having beforehand detailed knowledge such as which menu the desired instruction being included in.

In the program editing section 316, an operation program creation section 341 provides a function, by using one or more words identified by the voice recognition section 311 as a file name, for newly creating a file of the operation program.

Additionally, the robot teaching device 30 further includes an operation program storage section 317 that stores a plurality of operation programs. In the program editing section 316, an operation program selection section 342 provides a function, based on the one or more words identified by the voice recognition section 311, for selecting one operation program to be created in the editing screen, from a plurality of operation programs stored in the operation program storage section 317. For example, in the robot teaching device 30, in a case where key operation is performed for displaying a list of operation programs stored in the operation program storage section 317 and voice input is made active, the operation program selection section 342 selects an operation program corresponding to the voice-inputted word as an editing target.

While the invention has been described with reference to specific embodiments, it will be understood, by those skilled in the art, that various changes or modifications may be made thereto without departing from the scope of the following claims.

In the embodiment described above, although an example is described in which teaching input by key operation and teaching input by voice are switched by one input changeover switch, various configurations can be considered as a configuration in which such switching operation is performed by key operation. For example, a switch for turning on voice input and a switch for turning off voice input may be separately provided.

The program for executing the voice input teaching process (FIG. 3, FIG. 7, and FIG. 9) described in the above embodiment can be recorded on various recording media (e.g., a semiconductor memory such as a ROM, an EEPROM and a flash memory, a magnetic recording medium, and an optical disk such as a CD-ROM and a DVD-ROM) readable by a computer.

The invention claimed is:

1. A robot teaching device configured to perform teaching of a robot, the robot teaching device comprising:
a display device;
an operation key formed of a hard key or a soft key disposed on a display screen of the display device, the operation key including an input changeover switch configured to switch whether or not to accept voice input;
a microphone configured to collect voice and output a voice signal;
a voice recognition section configured to perform voice recognition processing on the voice signal and output character information represented by the voice;
a correspondence storage section configured to store each of a plurality of types of commands used in the teaching of the robot and a recognition target word in association with each other;
a recognition target word determination section configured to determine whether or not a phrase represented by the character information includes the recognition target word stored in the correspondence storage section; and a command execution signal output section configured to switch, in response to the input changeover switch being operated, between a first operation in which a signal for executing the command corresponding to an operation to the operation key is outputted and a second operation in which a signal for executing the command stored in the correspondence storage section in association with the recognition target word determined to be included in the phrase represented by the character information is outputted, wherein the command execution signal output section includes an operating speed control section configured to, in a case where a first recognition target word associated with a first command to operate the robot is continuously determined to be included in the phrase by the recognition target word determination section, generate the signal for executing the first command in a manner that an average operating speed of the robot operated by the first command changes in accordance with frequency in which the first recognition target word is continuously determined to be included in the phrase by the recognition target word determination section.

2. The robot teaching device according to claim 1, wherein the operating speed control section generates the signal in a manner that the average operating speed increases as the frequency increases.

3. The robot teaching device according to claim 1, wherein the operating speed control section generates the signal in a manner that once the first recognition target word is determined to be included in the phrase, the operating speed of the robot is once increased to a first speed in response to the first command and then the operating speed is decreased in a deceleration pattern where the first speed is decreased to zero after a predetermined time has elapsed.

4. The robot teaching device according to claim 1, wherein the command execution signal output section includes an execution permission request section configured to cause the display device to display an image representing a message requesting execution permission before outputting a signal for executing the command.

5. The robot teaching device according to claim 4, wherein the execution permission request section determines whether the command is permitted to be executed based on an input operation via the operation key.

6. The robot teaching device according to claim 4, wherein the execution permission request section determines whether the command is permitted to be executed based on the character information output from the voice recognition section.

7. The robot teaching device according to claim 1, further comprising:
an input switching section configured to, while the voice input is made active by the input changeover switch being operated, switch a supply source configured to input character data to the robot teaching device from the operation key to the voice recognition section.

8. A robot teaching device configured to perform teaching of a robot, the robot teaching device comprising:
a display device;
an operation key formed of a hard key or a soft key disposed on a display screen of the display device, the operation key including an input changeover switch configured to switch whether or not to accept voice input;
a microphone configured to collect voice and output a voice signal;
a voice recognition section configured to perform voice recognition processing on the voice signal and output character information represented by the voice;
a correspondence storage section configured to store each of a plurality of types of commands used in the teaching of the robot and a recognition target word in association with each other;
a recognition target word determination section configured to determine whether or not a phrase represented by the character information includes the recognition target word stored in the correspondence storage section; and
a command execution signal output section configured to switch, in response to the input changeover switch being operated, between a first operation in which a signal for executing the command corresponding to an operation to the operation key is outputted and a second operation in which a signal for executing the command stored in the correspondence storage section in association with the recognition target word determined to be included in the phrase represented by the character information is outputted, wherein the recognition target word determination section is configured, in a case where the phrase represented by the character information does not include the recognition target word stored in the correspondence storage section, to extract, from the correspondence storage section, at least one of the recognition target word having a predetermined relevance with the phrase represented by the character information, and to display, on the display device, a selection screen configured to accept an operation input to select one from at least one of the command associated with the at least one of the recognition target word that is extracted in the correspondence storage section.

9. The robot teaching device according to claim 8, wherein the recognition target word determination section extracts at least one of the recognition target word having a meaning common to the phrase represented by the character information from the correspondence storage section.

10. The robot teaching device according to claim 8, wherein the command execution signal output section includes an execution permission request section configured to cause the display device to display an image representing a message requesting execution permission before outputting a signal for executing the command.

11. The robot teaching device according to claim 10, wherein the execution permission request section determines whether the command is permitted to be executed based on an input operation via the operation key.

12. The robot teaching device according to claim 10, wherein the execution permission request section determines whether the command is permitted to be executed based on the character information output from the voice recognition section.

13. The robot teaching device according to claim 8, further comprising:
an input switching section configured to, while the voice input is made active by the input changeover switch being operated, switch a supply source configured to input character data to the robot teaching device from the operation key to the voice recognition section.

\* \* \* \* \*